(12) United States Patent
Kureti et al.

(10) Patent No.: US 7,662,744 B2
(45) Date of Patent: Feb. 16, 2010

(54) PROCESS FOR PRODUCING AN SCR CATALYST

(75) Inventors: Sven Kureti, Karlsruhe (DE); Peter Balle, Karlsruhe (DE); Bastian Geiger, Hainfeld (DE)

(73) Assignee: Universitaet Karlsruhe (DE)

( * ) Notice: Subject to any disclaimer, the term of this patent is extended or adjusted under 35 U.S.C. 154(b) by 47 days.

(21) Appl. No.: 11/625,108

(22) Filed: Jan. 19, 2007

(65) Prior Publication Data
US 2007/0173404 A1 Jul. 26, 2007

(30) Foreign Application Priority Data
Jan. 20, 2006 (EP) .................... 06001186

(51) Int. Cl.
*B01J 21/06* (2006.01)
*B01J 23/24* (2006.01)
*B01J 23/745* (2006.01)

(52) U.S. Cl. .................. 502/305; 502/325; 502/349

(58) Field of Classification Search .......... 502/305, 502/325, 349
See application file for complete search history.

(56) References Cited

U.S. PATENT DOCUMENTS

| | | | |
|---|---|---|---|
| 4,760,045 A * | 7/1988 | Oishi et al. | 502/321 |
| 5,300,472 A * | 4/1994 | Brand et al. | 502/309 |
| 6,331,503 B1 * | 12/2001 | Wachs et al. | 502/305 |
| 6,686,311 B2 * | 2/2004 | Sun et al. | 502/325 |
| 6,755,963 B2 * | 6/2004 | Haluska et al. | 208/143 |
| 6,890,501 B2 | 5/2005 | Delahay et al. | |
| 6,893,553 B1 * | 5/2005 | Abe et al. | 208/208 R |
| 6,902,664 B2 * | 6/2005 | Timken | 208/111.01 |
| 7,288,182 B1 * | 10/2007 | Soled et al. | 208/112 |
| 2002/0025905 A1 | 2/2002 | Harris et al. | |
| 2005/0031514 A1 | 2/2005 | Patchett et al. | |

FOREIGN PATENT DOCUMENTS

| | | |
|---|---|---|
| EP | 0 393 905 A2 | 10/1990 |
| EP | 0 960 649 A2 | 12/1999 |
| EP | 1 475 149 A1 | 11/2004 |
| WO | 96/01689 A1 | 1/1996 |
| WO | 2005/014146 A1 | 2/2005 |

OTHER PUBLICATIONS

Apostolescu et al: "Selective Catalytic Reduction Of Nitrogen Oxides By Ammonia On Iron Oxide Catalysts" Environmental, Elsevier, Bd. 62, No. 1-2, Aug. 26, 2005, Section 104-114, XP005215024.

* cited by examiner

*Primary Examiner*—Timothy C Vanoy
(74) *Attorney, Agent, or Firm*—GrayRobinson, P.A.

(57) ABSTRACT

In a process for producing an SCR catalyst for the selective reduction of $NO_x$ in $NO_x$-containing exhaust gases of internal combustion engines, a support layer is applied to a substrate body. An iron salt dissolved in a liquid is applied to the support layer in such an amount that no excess of iron salt is present.

4 Claims, 1 Drawing Sheet

PROCESS FOR PRODUCING AN SCR CATALYST

FIELD OF THE INVENTION

The invention relates to a process for producing an SCR catalyst for the selective reduction of $NO_x$ in $NO_x$-containing exhaust gases of internal combustion engines. Furthermore, the invention relates to a catalyst for use in a selective reduction of $NO_x$ in $NO_x$-containing exhaust gases of internal combustion engines, an apparatus for the selective reduction of $NO_x$ in $NO_x$-containing exhaust gases of internal combustion engines and a process for the selective reduction of $NO_x$ in $NO_x$-containing exhaust gases of internal combustion engines.

BACKGROUND OF THE INVENTION

The emission regulations coming into force in the next few years will, in particular, also lead to a tightening of exhaust gas limit values for motor vehicles equipped with diesel engines. From the present-day point of view, a consequence of this is that an after-treatment of the exhaust gas is absolutely necessary for removing nitrogen oxides.

U.S. Pat. No. 6,890,501 B2 describes the purification of offgases from industry, for example in the production of nitric acid. Here, use is made of catalyst materials in which ion-exchanged zeolites or a $Fe_2O_3$/beta-zeolite is proposed as support material which serves to join the active component to the substrate body. In the $Fe_2O_3$/beta-zeolite material, the iron oxide is applied to the support material by means of excess impregnation, which leads to a number of disadvantages. Firstly, the actual final content of iron oxide on the support material can in this way be determined only with difficulty, as a result of which this ratio differs from one synthesis to the next and quality differences are obtained as a result. Secondly, sometimes complicated filtration and/or purification processes are necessary after the synthesis in order to obtain the desired material.

EP 0 393 905 B1 describes an SCR (Selective Catalytic Reduction, i.e. the use of $NH_3$ as reducing agent) catalyst which has an iron-containing beta-zeolite as support material and active component. The joining of the iron to the zeolite is carried out by means of ion exchange, so that the iron is present in ion-exchanged form on the zeolite. However, various experiments have shown that such catalysts in which the active component is present in ion-exchanged form have comparatively poor short- and long-term activities in the reduction of $NO_x$-containing offgases.

US 2005/0031514 A1 describes the application of diesel particle filters which are coated with an SCR catalyst. Here too, the iron is present in ion-exchanged form, which leads to the abovementioned disadvantages.

EP 1 475 149 A1 discloses a catalyst for the reduction of NO to $N_2$ by means of hydrogen under $O_2$-rich conditions. This known catalyst is based on platinum which is distributed in an amount of from 0.1 to 2 per cent by weight on a support material comprising magnesium oxide or cerium oxide or a precursor thereof. Although quite good results are obtained in the reduction of $NO_x$ using this catalyst, this catalyst, too, could reach its limits in the case of future pollutant limit values. In addition, an in-principle problem with the presence of hydrogen over platinum-containing catalysts is that NO is also converted into the undesirable greenhouse gas $N_2O$, also known as laughing gas.

A process for removing nitrogen oxides from an offgas stream is described in EP 0 666 099 B1. The catalyst used here adsorbs the nitrogen oxides present in the offgas, after which a gas having a particular content of a reducing substance is supplied to the catalyst at prescribed time intervals and for particular periods of time. However, such storage catalysts in which basic components such as lithium oxide, potassium oxide, sodium oxide, barium oxide or similar oxides are used require relatively complicated control and usually have a high regeneration requirement.

In the case of these $NO_x$ storage catalysts, the NO which is mainly emitted is oxidized over a catalyst comprising platinum to $NO_2$ which is subsequently adsorbed on specific storage media, for example $BaCO_3$. When the storage capacity of this catalyst is exhausted, a engine-induced regeneration of the catalyst in which the nitrogen oxides introduced are converted into nitrogen is commenced.

A further disadvantage of the known $NO_x$ storage catalysts is the risk of poisoning of the $NO_x$ sorbents by the sulphur oxides $SO_2$ and $SO_3$ present in the offgas. To overcome these problems, complicated engine management strategies are usually necessary.

EP 0 960 649 B1 discloses an offgas purification catalyst in which the materials used comprise cerium oxide and/or zirconium dioxide mixed oxides which serve to remove saturated hydrocarbons from the offgas. Ammonia is used as reducing agent for the nitrogen oxides present in the offgas.

However, the active component $V_2O_5$ frequently used in such SCR catalysts is associated with toxicological concerns and can also melt or sublime at very high offgas temperatures ($>650°$ C.).

A further disadvantage of the known solutions for the removal of $NO_x$ from $O_2$-rich exhaust gases is in most cases that the nitrogen oxides are reacted effectively only above $200°$ C. Since the temperature of the exhaust gases is steadily being reduced as a result of the continual optimization of the efficiency of internal combustion engines, the known solutions are associated with a great problem in terms of their effectiveness. For example, in the case of modern internal combustion engines operating according to the diesel principle for passenger cars, the exhaust gas temperature in the relevant certification cycle is below $150°$ C. for about 60% of the time and below $200°$ C. for about 75% of the time.

SUMMARY OF THE INVENTION

It is therefore an object of the present invention to provide a process for producing an SCR catalyst for the selective reduction of $NO_x$ in $NO_x$-containing exhaust gases of internal combustion engines using the reducing agent ammonia. A further object of the invention is to provide a catalyst for use in a selective reduction of $NO_x$ in $NO_x$-containing exhaust gases of internal combustion engines which consists exclusively of one or more toxicologically acceptable substances and can effectively reduce nitrogen oxides even at low temperatures of less than $200°$ C.

According to the invention, a catalyst for selectively reducing $NO_x$ in an exhaust gas stream is produced by applying an iron salt solution to a support layer on a substrate body. The amount of iron salt in the solution is selected such that no excess iron salt is present after impregnation of the support layer with the solution.

In the process of the invention, a defined amount of iron salt is dissolved in a known amount of liquid and the resulting solution is applied to the support layer so that after this impregnation of the support layer there is no excess of iron salt solution present. Instead, there is a precisely determined and fixed amount of the solution and thus of iron, so that exactly the same amount of iron is applied to the support layer in each impregnation. In this way, reproducible catalysts having constant good properties can be produced even in mass production.

A further advantage of the process of the invention is that no liquid remains on the support material after impregnation of the latter, so that the filtration and/or washing processes required in processes known from the prior art become unnecessary. After this impregnation, the coated support is calcined in air, resulting in the actual catalytically active component iron oxide being formed from the iron salt.

The use of iron oxide has been found to be particularly advantageous for the effectiveness of the catalyst produced by the process of the invention, since a very much higher proportion of the pollutants can be removed from the exhaust gas of an internal combustion engine in this way. Compared to systems exchanged with iron ions (e.g. Fe-β-zeolite), the material containing iron oxide according to the present invention has an at least equal SCR activity and a considerably better long-term hydrothermal stability.

In the process, it has been found to be particularly advantageous to use water as liquid. For the support layer, which should have a very high surface area, it is possible to use a zeolite, but possibly also a nanosize, oxidic material.

As regards the effectiveness of the catalyst 1, it has been found to be advantageous to apply such an amount of iron oxide to the support layer that the proportion of iron within the support layer is 0.1-5 per cent by mass.

In a preferred embodiment, the catalyst comprises a substrate body, a support layer applied to the substrate body, an active layer applied to the support layer. The active layer comprises iron oxide and at least one of a promoter.

The inventors have surprisingly found that precisely the promoters tungsten, zirconium and/or molybdenum are able to increase the activity of the catalyst and reduce its hydrothermal ageing. In particular, nitrogen oxides can be reduced effectively by means of the catalyst of the invention even at low temperatures.

In an advantageous embodiment of the invention, the substrate body can be a honeycomb body which is composed of a ceramic material and simultaneously serves as particle filter.

However, the substrate body can, as an alternative, also be formed by a metal substrate.

The invention further relates to an apparatus and process for the selective reduction of $NO_x$ in $NO_x$-containing exhaust gases of internal combustion engines comprising such a catalyst. The introduction of reducing agent into the exhaust gas line in which the catalyst is located makes the reduction of $NO_x$ possible. The reduction of $NO_x$ is improved by $NO_2$ which is formed by oxidation of NO by means of the active component comprising iron oxide which is present in the catalyst.

A process for the selective reduction of $NO_x$ in $NO_x$-containing exhaust gases of internal combustion engines by means of such an apparatus is also provided.

Further advantageous embodiments and developments of the invention are given in the remaining subordinate claims. Working examples of the invention are presented in principle below with the aid of the drawing.

DETAILED DESCRIPTION

Figure 1:
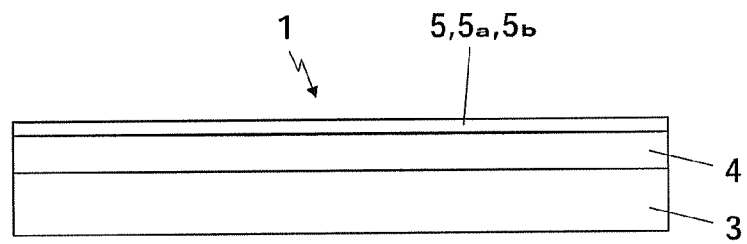
FIG. 1 shows, very schematically, an embodiment of the structure of the catalyst of the invention.
Figure 2:
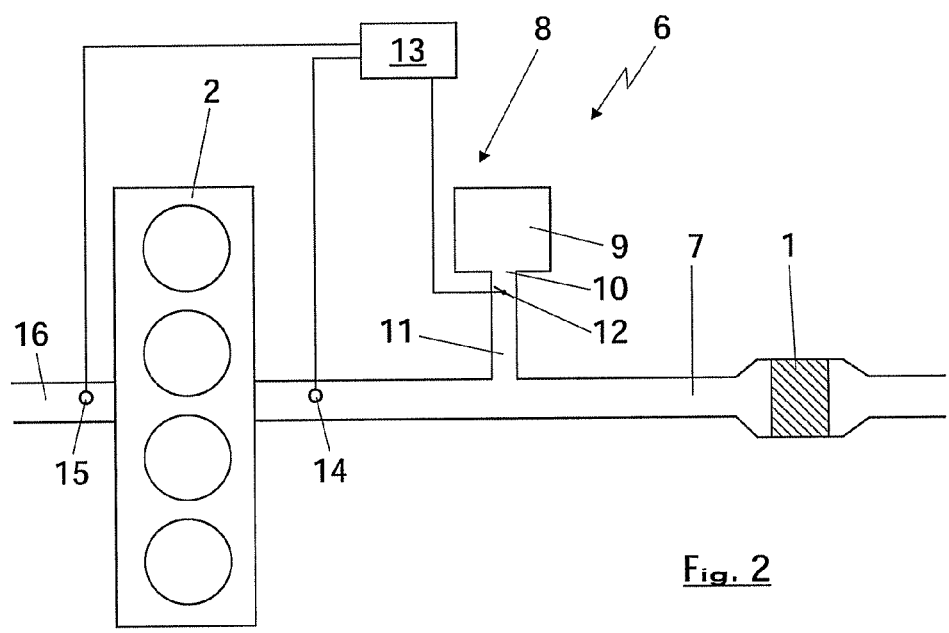
FIG. 2 schematically shows an apparatus according to the invention for the selective reduction of $NO_x$.

FIG. 1 shows, very schematically, a first embodiment of an SCR catalyst 1 which serves for the selective reduction of $NO_x$ in the exhaust gases of an internal combustion engine 2 which is shown in FIG. 2 and preferably operates according to the diesel principle. The catalyst 1 has a substrate body 3 which gives the catalyst rigidity and can, for example, be configured as a honeycomb body and can consist of a ceramic material. The substrate body 3 can also be designed as a particle filter in order to filter any soot particles from the exhaust gases. As an alternative, it is also possible for the substrate body 3 to be made of a metal substrate, with the honeycomb shape bringing the advantage of a low pressure drop.

A support layer 4 which is preferably extremely porous and preferably has a surface area of at least 50 $m^2/g$, more preferably at least 100 $m^2/g$, is applied to the substrate body 3. For the support layer 4, it is possible to use either a zeolite, in particular a beta-zeolite, or a nanosize, oxidic material (e.g. $ZrO_2$) which may additionally contain at least one thermal stabilizer. To join the support layer 4 to the substrate body 3, a binder can be used if required, but this is not absolutely necessary. A coating 5 which comprises an active component 5a, which in the present case comprises iron oxide ($Fe_xO_y$), and can contain a promoter 5b selected from the group consisting of tungsten, zirconium and molybdenum is present on the support layer 4. Precisely these materials have been found to be particularly suitable for the effectiveness of the catalyst 1, with the particular SCR activity of the iron oxide being achieved by the targeted generation of $Fe_xO_y$ clusters. These relatively small $Fe_xO_y$ units are achieved firstly by means of a relatively low mass loading of iron and secondly by means of the extremely high-surface-area support layer 4. In contrast, large crystalline iron oxide domains are less suitable as catalytic component.

The catalyst 1 is produced in the following way: A precursor substance of the active component 5a (iron oxide), namely iron salt, is firstly dissolved in a liquid, in particular in water, using such an amount of iron salt and liquid that no excess of iron salt solution is present in the later application of this solution to the support layer 4. The amount of iron salt, preferably sulphate or nitrate, and of the liquid required for this can be determined by experiment or else be calculated. As a result, the amount of iron oxide precursor present on the entire support layer 4 is such that a high effectiveness of the catalyst 1 is achieved in the reduction of $NO_x$ in $NO_x$-containing exhaust gases. After application of the iron oxide which represents the active component 5a, no purification process is necessary and calcination can instead be carried out immediately afterwards. Preference is given to applying iron oxide to the support layer 4 in such an amount that the proportion of iron within the support layer 4 is 0.1-5 per cent by mass.

The promoters 5b mentioned above can be applied together with the active component 5a to the support layer 4, i.e. they can be present in the abovementioned solution which is applied without an excess to the support material 4. However, it is also possible for at least one promoter 5b to be applied before or after impregnation with the iron oxide solution. The catalyst 1 produced in this way has a considerable long-term hydrothermal stability. For example, the SCR activity of the catalyst 1 is not impaired even after ageing for 24 hours at 800° C. in an exhaust gas stream having a high water and oxygen content.

FIG. 2 shows an apparatus 6 for the selective reduction of $NO_x$ in the exhaust gases of the internal combustion engine 2, by means of which it is possible to carry out a process for the selective reduction of $NO_x$ in the exhaust gases of the internal combustion engine 2, wherein urea as precursor substance of the reducing agent ammonia is preferably introduced into the exhaust gases.

Here, the catalyst 1 is arranged in an exhaust gas line 7 from the internal combustion engine 2. The apparatus 6 also has a reducing agent feed facility 8 which comprises a container 9 which is provided with a feed opening 10. The reducing agent can be metered in as a solid or as a constituent of an aqueous solution which can be provided with at least one stabilizer. The feed opening 10 is adjoined by a feed line 11 which leads to the exhaust gas line 7. The feed opening 10 is provided with a closure 12 whose state of openness can be altered by the action of a control device 13. The control device 13 can in turn be connected to an $NO_x$-sensor 14 located in the exhaust gas line 7 and to a sensor 15 which is located in an intake line 16 which leads to the internal combustion engine 2. The sensor 15 is in this case configured as an air mass sensor known per se and is able to measure the mass stream of air flowing into the internal combustion engine 2. As an alternative, the sensor 15 could also be located in the exhaust gas line 7 and it would also be possible to provide a temperature sensor in the exhaust gas line 7. Furthermore, one of the two sensors 14 or 15 could also be omitted.

The two sensors 14 and 15 make it possible to determine a particular state in the exhaust gas line 7 or in the intake line 16 and to pass it on to the control device 13. The control device 13 is therefore able to feed the urea present in the container 9 into the exhaust gas line 7 as a function of the $NO_x$ concentration inside the exhaust gas line 7 or as a function of a mass stream of air through the internal combustion engine 2. In this way, it is possible, for example, to introduce a larger amount of urea into the exhaust gas line 7 in the case of an acceleration event during which a higher $NO_x$ outlet is to be expected. It is also possible to store the required data in a performance characteristics memory in the control device 13 in order to feed in an increased amount of urea at particular times.

It is also possible to feed the urea continuously into the exhaust gas line 7. A further possibility is to feed a particular basic amount of urea into the exhaust gas line 7 and to increase the amount of urea introduced in the case of a requirement determined by one of the sensors 14 or 15.

If the substrate body 3 is not simultaneously configured as a particle filter as has been briefly described above, a particle filter (not shown) can be installed in the exhaust gas line 7 upstream or downstream (relative to the directional flow of the exhaust gas) of the catalyst 1. The substrate body 3 then serves merely to hold the support layer 4 in place.

A hydrolysis catalyst which, for example, consists of aluminium oxide or comprises aluminium oxide and in which urea and $H_2O$ are converted into $2\ NH_3$ and $CO_2$, an NO oxidation catalyst which, for example, comprises platinum and in which NO and $\frac{1}{2} O_2$ are converted into $NO_2$ and/or an $NH_3$ barrier catalyst by means of which $NH_3$ leakage is prevented by the reaction of $2\ NH_3$ with $\frac{3}{2} O_2$ to form $N_2$ and $3\ H_2O$ can additionally be present in the exhaust gas line 7. These components are, however, known in principle and will therefore not be described in more detail. Furthermore, it is possible to omit one or more of these if appropriate.

While the foregoing constitute preferred embodiments of the invention according to the best mode presently contemplated by the inventors of making and carrying out the invention, it is to be understood that the invention is not limited to the particulars described above. In light of the present disclosure, various alternative embodiments and modifications will be apparent to those skilled in the art. Accordingly, it is to be recognized that changes can be made without departing from the scope of the invention has particularly pointed out and distinctly claimed in the appended claims as properly construed to include all legal equivalents.

What is claimed is:

1. A catalyst for use in a selective reduction of $NO_x$ in $NO_x$-containing exhaust gases of internal combustion engines with introduction of a reducing agent into the exhaust gases, said catalyst comprising: a substrate body; a support layer located overlying said substrate body and having a surface area of at least $50\ m^2/$; and, an active layer formed from at least one coating applied to said support layer, said at least one coating comprising (i) an active component which comprises an iron oxide and (ii) a promoter selected from the group consisting of tungsten, zirconium and molybdenum, said promoter serving as a stabilizer for said iron oxide, said support layer including iron impregnated into said support layer from said iron oxide, said impregnated iron representing a mass proportion of said support layer in the range of 0.1 percent to 5 percent.

2. A catalyst for use in a selective reduction of $NO_x$ in $NO_x$-containing exhaust gases of internal combustion engines with introduction of a reducing agent into the exhaust gases, said catalyst comprising: a substrate body, a support layer applied to the substrate body; an active component applied to said support layer, and; at least one promoter applied to said support layer, said active component comprising iron oxide and said at least one promoter being selected from the group consisting of tungsten, zirconium and molybdenum, said substrate body comprising a honeycomb body being composed of a ceramic material and serving as a particle filter.

3. A catalyst for use in a selective reduction of $NO_x$ in $NO_x$-containing exhaust gases of internal combustion engines with introduction of a reducing agent into the exhaust gases, said catalyst comprising: a substrate body comprised of a metal substrate; a support layer applied to the substrate body; an active component applied to said support layer, and; at least one promoter applied to said support layer, said active component comprising iron oxide and said at least one promoter being selected from the group consisting of tungsten, zirconium and molybdenum.

4. A catalyst for use in a selective reduction of $NO_x$ in $NO_x$-containing exhaust gases of internal combustion engines with introduction of a reducing agent into the exhaust gases. said catalyst comprising: a substrate body; a support layer located overlying said substrate body and having a surface area of at least $100\ m^2/g$; and, an active layer formed from at least one coating applied to said support layer, said at least one coating comprising (i) an active component which comprises an iron oxide and (ii) a promoter selected from the group consisting of tungsten, zirconium and molybdenum, said promoter serving as a stabilizer for said iron oxide, said support layer including iron impregnated into said support layer from said iron oxide, said impregnated iron representing a mass proportion of said support layer in the range of 0.1 percent to 5 percent.

* * * * *